July 1, 1958 W. H. NEWELL 2,840,992

SYNCHRONIZING CONTROL FOR MOTION REPRODUCING DEVICES

Filed Aug. 4, 1942 4 Sheets-Sheet 1

INVENTOR
WILLIAM H. NEWELL

BY

ATTORNEY

July 1, 1958 W. H. NEWELL 2,840,992

SYNCHRONIZING CONTROL FOR MOTION REPRODUCING DEVICES

Filed Aug. 4, 1942 4 Sheets-Sheet 2

INVENTOR
WILLIAM H. NEWELL

Victor D. Borst
ATTORNEY

SYNCHRONIZING CONTROL FOR MOTION REPRODUCING DEVICES

Filed Aug. 4, 1942 4 Sheets-Sheet 3

INVENTOR
WILLIAM H. NEWELL
Victor D. Borst
ATTORNEY

INVENTOR
WILLIAM H. NEWELL
Victor D. Borst
ATTORNEY

United States Patent Office 2,840,992

Patented July 1, 1958

2,840,992

SYNCHRONIZING CONTROL FOR MOTION REPRODUCING DEVICES

William H. Newell, New York, N. Y., assignor to Sperry Rand Corporation, a corporation of Delaware Application August 4, 1942, Serial No. 453,549

14 Claims. (Cl. 60—53)

In its specific form this invention is an embodiment in a hydraulic mechanism of the principles disclosed in my copending application Serial No. 451,070, filed July 15, 1942, now U. S. Patent No. 2,427,154, issued Sept. 9, 1947. It relates to a follow-up mechanism of the type in which a servomotor energized through means governed by a relay control supplies the power to the follower member.

As with the copending application the primary object of the invention is to bring the follower member, when a substantial error in phase relation has developed, smoothly and rapidly into synchronism with the primary member without overrun or hunting. For this purpose there is provided a supplemental power device that becomes energized when the error or disagreement assumes a predetermined value and functions to maintain a response that departs from the movement that is being followed by not more than the predetermined error. It adds to the response from the servomotor when the error is increasing and it subtracts what it has added as the error decreases, thereby keeping the effective response in substantially constant relation to the movement being followed. The speed at which the supplemental power device subtracts the response component that it added during the increase of error is related to the magnitude of the error, and the speed therefore decreases as the error diminishes. The point at which the subtracting speed of the supplemental power device is surpassed by the speed of the response of the follower member as it approaches agreement with the primary member determines the point at which the control for the servomotor starts to slow down the follower member, and the subtracting speed is made a function of the error so that this point is properly determined to cause the two members to come smoothly into synchronism.

In accordance with this invention the controls for the servomotor are hydraulically operated and the auxiliary motor that supplements the response from the servomotor is a hydraulic motor the control valve of which is responsive to the position and degree of movement of the controls for the servomotor. Additionally a response valve actuated by the auxiliary motor coacts with the control valve to regulate the reverse speed of the auxiliary motor according to the amount of error. The net effect is a regulation of the point at which the control for the servomotor is reversed as the follower approaches synchronism, the relative speed of the follower and primary members during synchronizing being a function of the distance between them, and the point of reversal of the controls being just sufficiently advanced to avoid overrun and cause the follower to come smoothly into synchronism.

The hydraulic control valves are of the piston type that govern lateral ports to regulate the effective pressure on a main piston connected to operate the control member of the servomotor. A pilot valve is the member immediately moved and its movement is reproduced by an amplifier piston valve which is the one primarily effective to regulate the pressure on the main operating piston. The amplifier valve controls ports that lead to the control valve for the auxiliary motor, which latter valve in turn controls the admission of pressure fluid to the auxiliary motor. At the proper time the auxiliary motor is made to reverse and through a response piston the motor is made to shut itself off during the reverse running at a controlled rate so that its speed is regulated according to a function of the error.

For the purpose of disclosure it may be assumed that the incoming movement which is to be followed comes from a sighting device such as a director sight in gun fire control, and that the follower member is a piece of ordnance. The primary movement will therefore be referred to as the signal, and the follower member as the gun.

The invention comprehends other features as will appear from the following particular description. The illustrated embodiment of the invention will now be described and thereafter the invention will be pointed out in claims.

Figure 1:
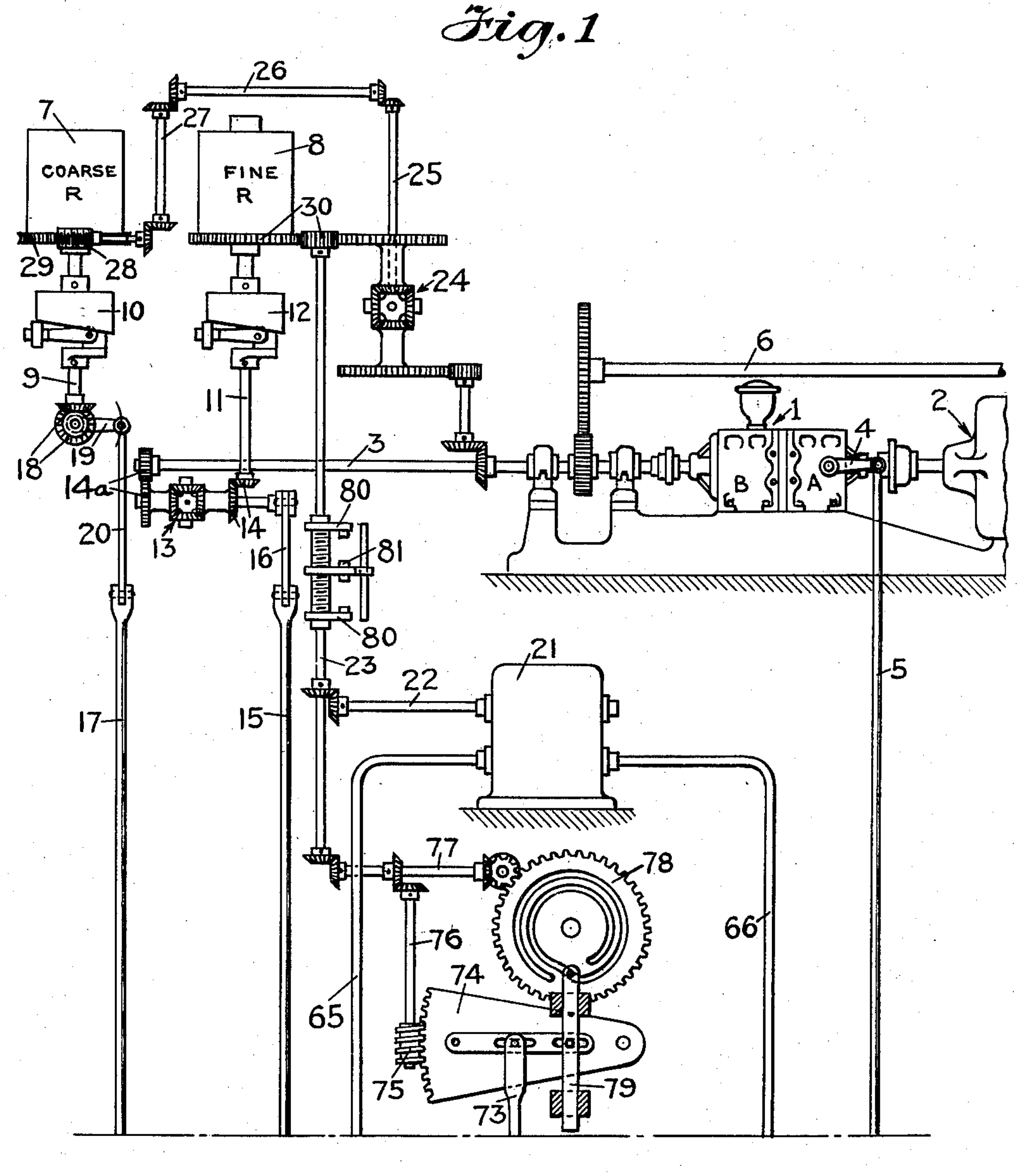
Fig. 1 is a diagram of an embodiment of the invention exclusive of the valving for the hydraulic control.

In its fundamental elements the system is a conventional servomotor and relay control follow-up mechanism, the power of servomotor 1 being a hydraulic variable speed gear of well known form which includes a hydraulic pump known as the "A" end and driven by an electric motor 2, and a hydraulic motor known as the "B" end and connected to a shaft 3 which may be termed the response shaft. The pump is rotated at constant speed and the speed of the motor or "B" end is determined by the position of a tilting box or swash plate actuated by a crank arm 4 that is operated by a connecting stem or rod 5 coupled to the main piston of the hydraulic control, as will be later described. The output or load shaft 6 which is the follower shaft or the one that operates the elevating gear for the gun, is geared to the response shaft 3.

The incoming signal which is to be followed is reproduced in a 1 to 1 ratio by a coarse receiver 7 of an electrical synchronous transmission system, and in a multiplied ratio, say 36 to 1, by a fine receiver 8. The rotor of the coarse receiver is connected to operate shaft 9 through a yieldable drive coupling 10 of the construction shown in the patent to Poitras and Tear, No. 2,134,488. Similarly the rotor of fine receiver 8 is connected to drive shaft 11 through yieldable drive coupling 12.

The movements of shafts 3 and 11 are compared by differential 13, shaft 11 driving one side of the differential through gears 14 and shaft 3 driving the other side of the differential through gears *14a*. The center or spider or the differential is connected to operate the fine pilot valve rod 15 through a crank connection with connecting rod 16. The shaft 9 which is operated by the coarse receiver is connected to actuate the coarse pilot valve stem or rod 17 through gears 18, crank 19 and connecting rod 20.

The hydraulic auxiliary motor 21 has an output shaft 22 geared to the supplemental response shaft 23. The movement of the shaft 23 is differentially combined with the movement of response shaft 3 by differential 24, and this combined quantity is differentially compared with the input of the coarse receiver 7. As shown shaft 25 which is the output shaft of differential 24 is geared through shafts 26 and 27 with the shaft of worm 28 which meshes with worm gear 29 on the stator of the coarse receiver. The combined response from the two motors therefore turns the stator and functions proportionately to neutralize the rotation of the magnetic field. Thus the signal and composite response are differentially compared by the coarse receiver and the movement of coarse pilot valve stem 17 represents the difference between these two quantities.

The response of auxiliary motor 21 is also introduced into the input of differential 13 so that the output of that differential represents the comparison of the combined responses of the two motors with the signal, that is, the angular movement transmitted to the fine receiver 8. In the arrangement shown, the movement of response shaft 23 is differentially compared with the signal, and the movement of response shaft 3 is differentially compared with the result of that comparison, but it is manifest that alternatively the two responses may be combined and the combination be compared with the signal.

As shown, the response shaft 23, in addition to being geared to one side of differential 24, is geared to the stator of receiver 8 by spur gears 30, with the result that the movement of response shaft 23 proportionately neutralizes the rotation of the magnetic field and the signal at the fine ratio is differentially combined with the auxiliary motor response, just as the signal at the coarse ratio is differentially combined with the composite response in receiver 7. So because of the shaft 11 and the differential 13 the movement of the fine pilot valve stem 15 represents the error between the signal and the pseudo or composite response. Since the auxiliary motor is not energized until the error assumes a certain minimum value, it will be understood that within that value, that is, when the gun is following the signal within close limits, the movement of stem 15 is entirely representative of the difference between the signal and the gun as represented by the response shaft 3.

Figure 2:
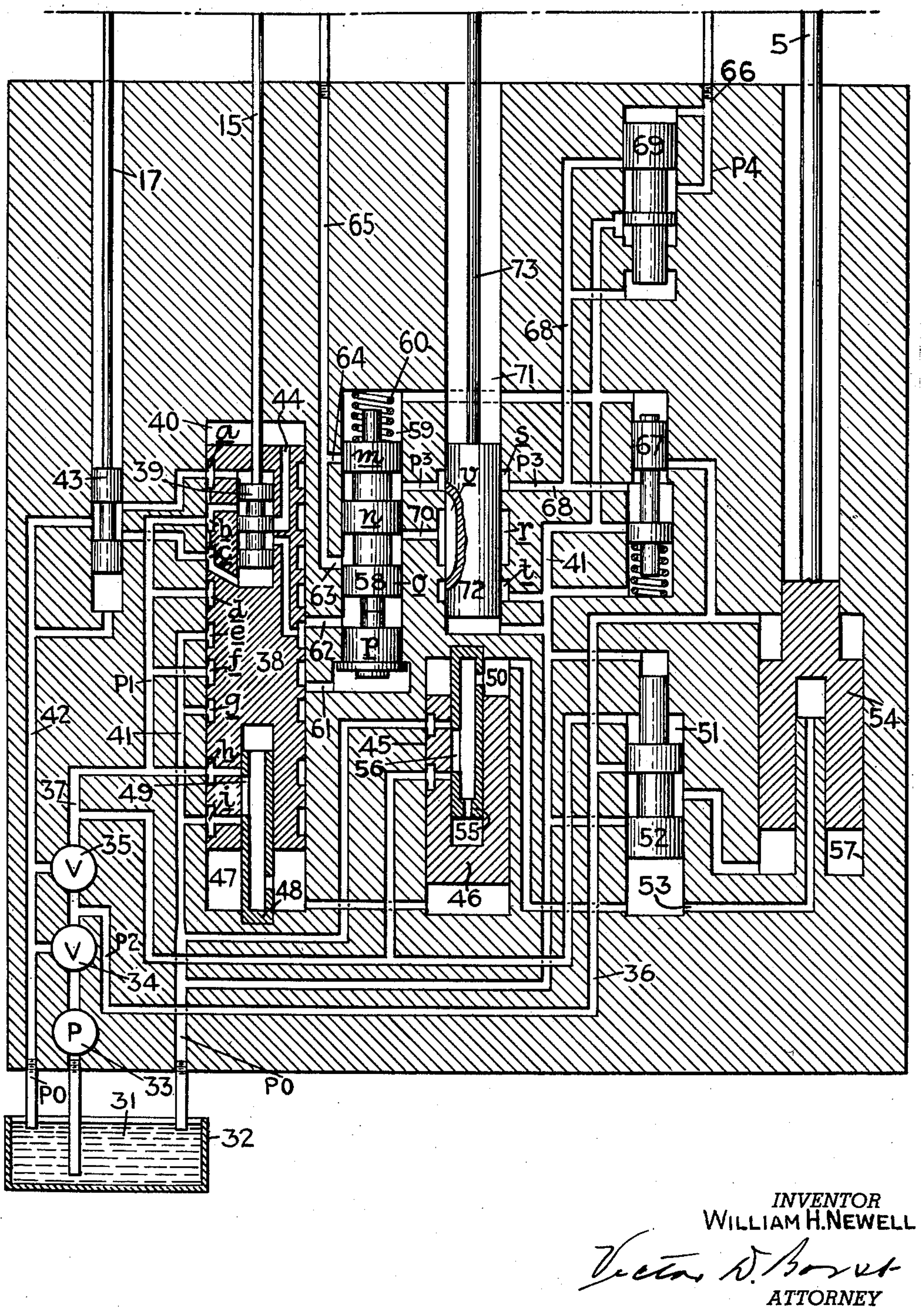
Fig. 2 is a schematic diagram of the hydraulic control system and supplements and is intended to form a continuation of Fig. 1.

The hydraulic control mechanism shown schematically in Fig. 2 of the drawings, so far as the operation of the tilting box of the pump of power motor 1 is concerned, is like that shown in my copending application Serial No. 313,678, filed Jan. 13, 1940, now U. S. Patent No. 2,739,447, issued Mar. 27, 1956, particularly Fig. 3 thereof. As in that case means are provided to correct both for velocity and acceleration errors. In other words the instant position of the main piston and hence the speed of the power motor are effected in accordance with the position, velocity and acceleration of the signal.

The mechanism schematically shown in Fig. 2 consists of a valve block in which are the several moving parts and the passages for conducting the hydraulic pressure under the control of the moving parts which act as valves. A quantity of oil 31, stored in reservoir 32, is supplied to the valve arrangement as a whole by a constant speed pump 33 through two reducing valves 34 and 35. The high pressure P2 from valve 34 is delivered to the passage 36, while the lower pressure P1 from valve 35 is delivered to passage 37, both of which passages branch and lead to recesses in the valve block.

The first recess to consider is the one that contains the amplifier piston valve 38 which in turn is axially recessed near its upper end and contains the fine pilot valve 39 on the end of stem 15. The recess for the amplifier valve is indicated by the numeral 40. Two passages 41 and 42 are connected to the exhaust pressure P0. Spaced throughout its length the amplifier valve 38 is provided with a series of nine circumferential grooves, designated, *a, b, c, d, e, f, g, h* and *i*, respectively, from the top to the bottom ends, the spacing and width of the grooves being irregular so as to effect proper registration with ports for the operation of the system, as will appear. One branch of passage 37 under pressure P1 communicates with grooves *b, d, f* and *h*. Passage 41 under exhaust pressure P0 communicates with grooves *e, g* and *i*. Passage 42 under control of the coarse pilot valve 43 on stem 17 communicates with grooves *a* and *c*, and also with the bottom of the recess in which coarse pilot valve 43 moves. Groove *c* communicates through a passage in the amplifier valve with the bottom of the recess in which the fine pilot valve moves and groove *a* communicates similarly with the top of the recess. Both grooves *a* and *c* are connected to exhaust pressure when coarse pilot valve 43 is in its central position, as shown, that is, when the rotation of the magnetic field of the coarse receiver 7 is neutralized by the combined response from the two motors. Groove *b* which is between grooves *a* and *c*, is under pressure P1 and passages of small cross section connect groove *b* with both grooves *a* and *c*, with the result that there is a leakage of high pressure into grooves *a* and *c* and hence into the fine pilot valve recess on both ends of the valve. But with the coarse pilot valve 43 centered both ends of the recess are connected to exhaust and hence there is a balance of pressure on valve 39. When valve 43 moves and laps one of the passages leading to grooves *a* and *c*, the pressure will build up in that end and the fine pilot valve 39 will be moved its full extent in the opposite direction. In this way the coarse pilot valve takes control when the error between the combined response of the two motors and the input of the coarse receiver exceeds a certain limit, enough to close off one of the passages leading to grooves *a* and *c*.

Groove *e* under exhaust pressure communicates through a passage in the amplifier piston valve 38 with the recess for pilot valve 39, and groove *b* under pressure P1 similarly communicates with the pilot valve recess at a higher point. The pilot valve 39 has a central circumferential piston portion with a reduced portion above and below it, and the piston portion is wide enough to lap the portion of a passage 44 in the amplifier valve leading to the upper end of the recess 40 above the amplifier valve.

The bottom of the recess 40 below the amplifier valve communicates with the bottom of recess 45 in which is the acceleration piston 46. In this chamber comprising the bottoms of recesses 40 and 45 and the communicating passage, is contained a quantity of hydraulic liquid 47 which, as will be explained, is maintained at substantially one-half the pressure P1.

To correct for the velocity error, means are provided to place the bottom of the recess 40 which contains the liquid 47 in communication either with pressure P1 or with exhaust depending upon whether the amplifier valve moves down or up. This means consists of a tubular member 48 fixed in the valve block and which extends up into an axial recess in the amplifier valve and has an opening near its lower end that provides communication with the recess 40 below the valve 38, and an oblong opening 49 within the body of the valve which is just long enough to have the tube lap passages in the valve from grooves *h* and *i* when the valve is in central position, but to connect the interior of the tube with high pressure from the groove *h* so that there is a flow of liquid into the tubular member 48 if the valve moves down, and with exhaust pressure of groove *i* if the valve moves up thereby permitting flow from the tubular member 48.

It will be seen that the amplifier valve will reproduce the movement of the pilot valve 39 because a down movement of the pilot valve causes an increase in pressure on top of valve 38, and an up movement causes a decrease of pressure from the normal pressure on top of valve 38 which is substantially one-half the pressure P1. This change in pressure occurs as the central piston face of the pilot valve 39 is moved off its lapping position and connects passage 44 either with pressure groove *b* or exhaust groove *e*. A down movement of amplifier valve 38 tends to increase the pressure on liquid 47 and hence raises piston 46 an amount proportional to the movement of valve 38. An up movement of valve 38 tends to decrease the pressure on liquid 47 and hence unbalances piston 46 in the opposite direction.

As explained in my application Serial No. 313,678, the effect of this movement of valve 38 on the position of piston 46 is amplified by the liquid that is either admitted within or exhausted from the tube 48 through connection with one of grooves *h* and *i* as valve 38 moves down or up. This introduces the velocity correction above referred to.

Similarly piston 46 introduces a correction for the next derivative of position which is acceleration. The movement of piston 46 causes a displacement of hydraulic liquid 50 in the top end of recess 45 and in the bottom end of recess 51 in which the relay piston 52 moves. The top of recess 45 and the bottom of recess 51 are connected by a passage as shown, and this chamber of variable volumetric capacity also includes a passage 53 that leads to a recess in the main piston 54 connected to operating rod 5. A tube 55 is mounted in recess 45 and fits in a recess in piston 46. This tube is similar to tube 48 and has an elongated opening 56 adapted to communicate either with high or low pressure, depending on whether valve 46 moves up or down. This results in further liquid displacement in the bottom of recess 51 and a correspondingly amplified movement of piston 52.

The relay piston 52 is formed with a reduced portion at its upper end which is substantially one-half the area of the lower end. The annular chamber formed by the reduced portion of the piston is supplied with pressure P1 from passage 37. When the relay piston 52 is balanced, the pressures in the chambers above and below piston 52 will be inverse to the effective areas of the piston, therefore, the pressure of the hydraulic liquid 50 is normally one-half the pressure P1. Since the effective areas of the top and bottom of the acceleration piston 46 are equal, the normal pressure of the liquid 47 will also be equal to one-half of pressure P1. Since the effective area of the top of the amplifier piston valve 38 is substantially equal to the area of the bottom, the normal pressure on top of the valve 38 will be substantially one-half the pressure P1.

Relative movement of the pilot valve 39 and the amplifier valve 38 connect the passage 44 to pressure or exhaust so that the pressure in chamber 40 above valve 38 changes just enough to cause the amplifier valve 38 to follow the pilot valve 39. The flow through openings 49 and 56 is effective to change the volume of liquid 47 and 50 respectively, but does not appreciably affect the pressures. The accumulated flow through these openings determines the position of the main piston 54 and, therefore, the speed of the servomotor 1.

As shown, movement of piston 52 down or up from its central position connects the bottom of recess 57 below the main piston 54 either to exhaust pressure or to high pressure P2. The area of the top face of piston 54 is less than that of the bottom face and the pressure P2 is communicated to the recess 57 upon this top face. Thus as relay piston 52 moves up or down the main piston 54 is moved up or down due to the change in pressure in recess 57 and the speed of the power motor is changed accordingly. Because of the passage 53 the movement of the main piston 54 returns relay piston 52 to its central position and thus eliminates the cause of the movement and hence with each movement of the pilot valve the piston 54 is moved until a new position of balance is reached. This means that the position of the tilting box is changed and a new rate to the power motor is set up until the rate of the power motor equals the rate of movement of the signal received by the receiver 8. If the error gets great enough for the coarse pilot valve to take over, the fine pilot valve and hence valve 38 are moved to an extreme position and the power motor is caused to run at its maximum rate until the error is erased. It is under such conditions that the auxiliary motor operates to decelerate the power motor at the proper time and at the proper rate to bring the driven member smoothly into synchronism. The operation and control of this auxiliary motor will now be described.

The control valve for the auxiliary motor 21 is a piston valve 58 movable in recess 59 in the valve block. Throughout its length the valve has four spaced piston portions designated respectively by the letters *m*, *n*, *o* and *p*, the several piston portions being connected by reduced neck or stem portions. A spring 60 in the top of recess 59 bears on top of the valve 58 and biases it to a down position. The valve is in two parts, being sectioned through the lowermost neck between piston portions *o* and *p*. The bottom of the recess 59 in which the lower end of portion *p* extends is enlarged in diameter, forming a transverse shoulder, and the piston portion *p* has a circumferential flange at its lower end which cooperates with the shoulder to limit the upward movement of piston portion *p*.

A lateral passage 61 in the valve block connects the bottom of recess 59 with the recess 40 of the amplifier piston 38, and another lateral passage 62 connects the recess 40 with the recess 59 at a point immediately above the piston portion *p* in its uppermost position. The passage 61 is so located as to be alternately connected to grooves *f* and *g* as the amplifier piston reciprocates, and the passage 62 is located so as to be alternately connected to the grooves *d* and *e*. Thus the space between piston portions *o* and *p*, and the space under the piston portion *p* will at times be connected to pressure P1 and at times to exhaust pressure P0. When pressure is admitted through passage 62 the two parts of the piston valve will be caused to separate. When valve 38 is in its central position passage 61 is connected to groove *f* and passage 62 is connected to groove *e*.

Above the passages 61 and 62 in the valve block are two spaced lateral passages 63 and 64 form recess 59 that are branches of conduit 65 leading to one side of motor 21. The conduit 66 from the other side of the motor leads into the valve block to ports later to be described. The valve 58 controls the direction in which pressure fluid flows through conduits 65 and 66.

The pressure for operating motor 21 comes from pressure P2 in passage 36. A pressure regulating valve 67 of conventional construction is served by branches of passages 41 and 36 and develops a pressure P3 in passages 68 the value of which depends upon the adjustment of a biasing spring opposed in its action by the generated pressure P3. This P3 generator valve is similar in construction to the reducing valves 34 and 35.

Another pressure regulator valve 69 is served by pressure P3 in passage 68 and by exhaust pressure in passage 41 and generates pressure P4 in conduit 66 under one condition, that is, when conduit 65 is connected to exhaust as will presently be described, and connects conduit 66 to exhaust under another condition, that is when conduit 65 is connected to pressure P3, as will also presently be described. The valve 69 has an intermediate reduced portion connected to a branch of conduit 66, and has its bottom end reduced, thus making an intermediate piston portion. The bottom end of the valve is opposed by pressure P3 and the top end by the pressure in conduit 66. The area of the top face exceeds that of the lower face and hence the valve is balanced when the pressure in conduit 66 is less than the pressure P3 of passage 68. Any increase of pressure in conduit 66 depresses valve 69 and connects conduit 66 to exhaust passage 41, whereupon liquid will blow from motor 21 through conduit 66. Any decrease of pressure in passage 66 causes valve 69 to move up and connect conduit 66 to passage 68, whereupon liquid under pressure P4 will flow through conduit 66 to motor 21.

The top end of the recess 59 for control valve 58 is connected to exhaust passage 41, in parallel with the two ends of the recess of the P3 generator valve 67. The P3 pressure passage 68 communicates with the control valve recess 59 between piston portions *m* and *n* so that that space is always under pressure P3. When the valve 58 is raised from its central or off position shown in Fig. 2, the passage 68 is connected to passage 64 and conduit 65. The pressure in motor 21 and conduit 66 is also increased with the result that valve 69 moves down and connects conduit 66 to exhaust, whereupon liquid flows through motor 21 from conduit 65 to conduit 66 and the motor turns in a corresponding direction.

Leading from recess 59 below the passage 68 is a passage 70 that may be termed the transfer passage. It is adapted to communicate normally with the annular space about the reduced portion of valve 58 between piston portions *n* and *o*. In the valve block adjacent recess 59 is a recess 71 the bottom of which is connected to exhaust. A piston 72 in recess 71 is attached to stem 73 and is operated as a response from motor 21 through means presently to be described. Surrounding the recess 71 is a wide groove *r* formed in the block and disposed centrally of the piston 72 in its central or off position shown in Fig. 2, and a narrow groove *s* is formed in the block as an enlargement of recess 71 immediately above groove *r* and a similar groove *t* is located immediately below groove *r*. Passage 70 communicates with the wide groove *r* and passage 68 communicates with groove *s*. Groove *t* is connected with exhaust passage 41.

The piston 72 has formed in its cylindrical face a longitudinal groove *v* long enough to place groove *r* either in communication with groove *s* or groove *t*, depending upon the position of the piston, but the spacing of grooves *s* and *t* is such that they are both lapped by the piston when the piston is in the off position shown in Fig. 2. The groove *v* is shaped so as to make the rate of cut-off and hence the speed of motor 21 in its reverse direction the desired function of the error.

The response movement of piston 72 through stem 73 is effected by the operative connection with motor 21 shown in Fig. 1. A pivoted gear segment 74 is connected to the upper end of stem 73 by a pin and link device, and segment 74 is actuated by worm 75 on shaft 76 which is geared to shaft 77 driven from response shaft 23. Therefore movement of the motor 21 from its central or zero position will raise or lower stem 73 and piston 72, depending upon which way the motor is turning. As will be explained later groove *v* connects groove *r* with either groove *s* or groove *t* to control the return movement of motor 21 toward its zero position. It is evident that as soon as the motor moves the groove *v* back to its central position with the grooves *s* and *t* cut off, the motor stops at its zero or central position. Moreover the rate of flow depends upon the shape of the groove *v* which is designed according to the function of the error which it is desired that the motor speed shall follow.

To increase the sensitivity of motor 21 near the off or central position of valve 72, means are provided to accentuate the movement of the valve 72 for a unit of angular movement of the motor when the valve is near its central position. In the construction shown this is effected through a pivoted cam 78 which has two cam grooves that are concentric with the pivot and are connected by a short inclined portion. A pin rides in the slot as a cam follower and is carried by a sliding bar 79 that has a pin and slot engagement with the free end of the link to the center of which stem 73 is attached. It is apparent that with this arrangement a slight movement of cam 78 in either direction when the piston 72 and motor 21 are near central position will cause a substantial movement of the valve, and likewise the last movement of the motor toward centering the valve will effect a positive and accurate centering. In this way chattering and uncertainty are avoided when the motor is near its zero or central position.

Figures 3, 5, 6, 7, 8:
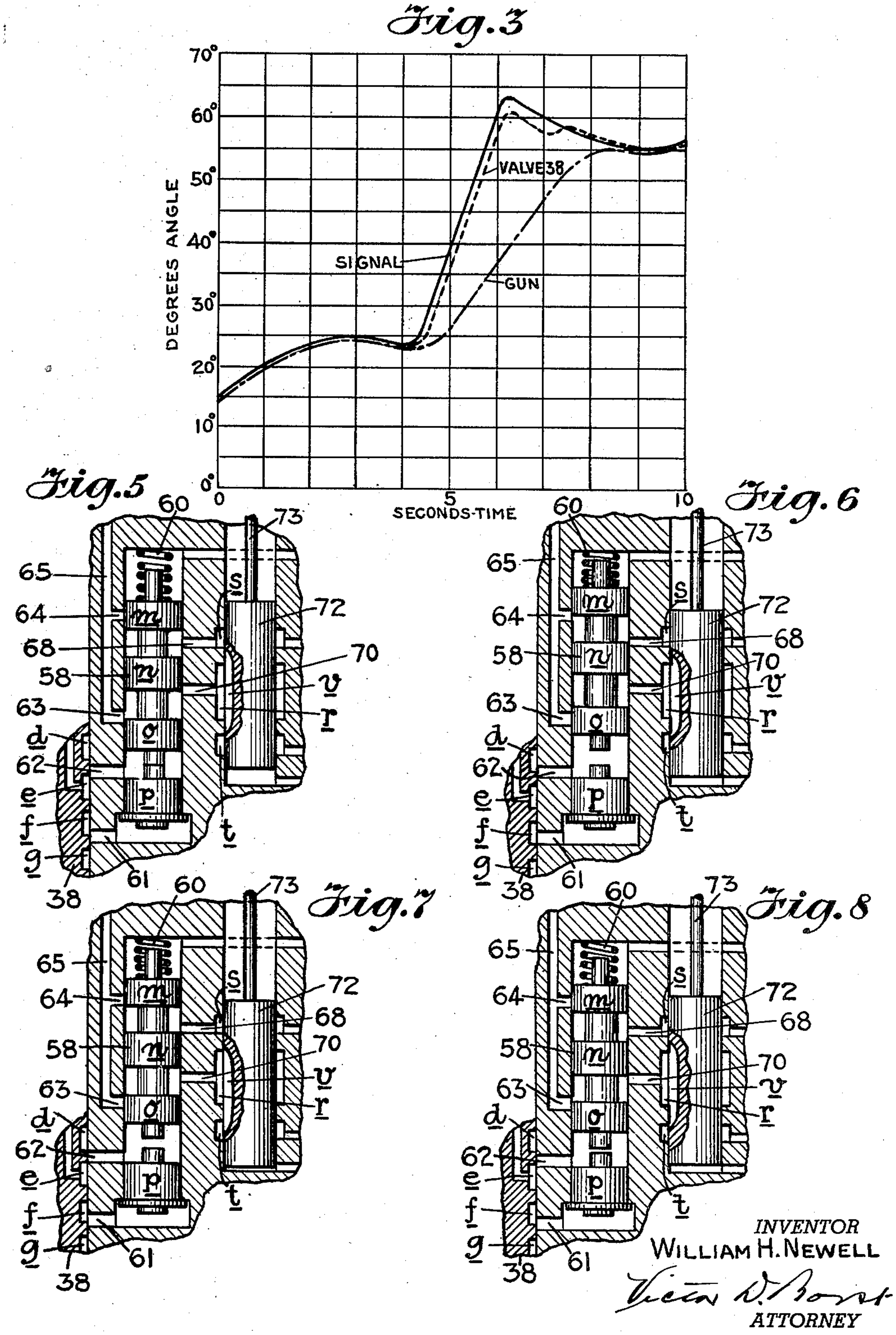
Fig. 3 is a graph showing the relative movements, under a condition including a rapid increase of signal, of the signal, gun and composite or pseudo response plotted against angular distance and time as coordinates.
Figs. 5, 6, 7 and 8 are diagrams showing the successive positions of the control valve for the auxiliary motor and of the immediately associated parts during the relative movements represented by the graph of Fig. 3.
Figures 4, 9, 10, 11, 12:
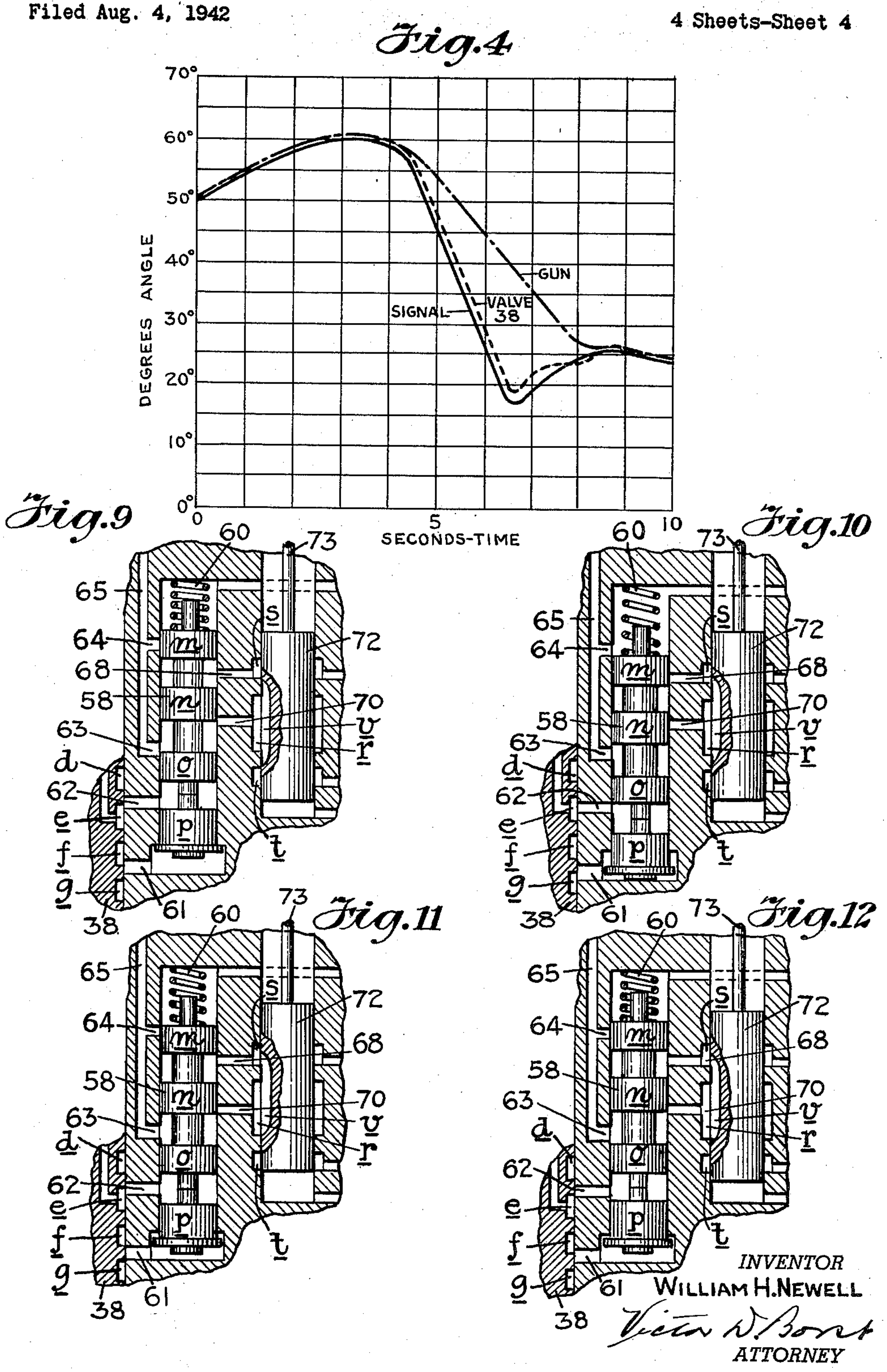
Fig. 4 is a graph using the same coordinates and showing the same relative movements under a condition including a rapid decrease of signal.
Figs. 9, 10, 11 and 12 are similar diagrams to show the successive positions during the relative movements represented by the graph of Fig. 4.

The functioning of the auxiliary motor control valve 58 and the piston 72 will appear more clearly from Figs. 5 to 12, inclusive which show the valve and its connections in its successive positions, first during a sudden increase of error as shown in Fig. 3 and then during a sudden decrease of error, as shown in Fig. 4.

When the gun is accurately following the signal there is no demand upon the auxiliary motor and it is idle. This is the condition during the first four and a fraction seconds in the graph of Fig. 3. Under that circumstance the valve 58 is in the condition shown in Fig. 5, which incidentally is the condition represented in Fig. 2. During that time the output of differential 13 which represents the error is only that which is required to position the tilting box to cause the gun to follow the signal in its sine wave movement occasioned for example by the roll of a ship upon which the director and gun are mounted. The signal and gun move together and the response from shaft 3 is able to keep the position of valve 38 within the error beyond which control valve 58 is operated to energize motor 21.

In this synchronizing condition, as shown in Fig. 5, the position of valve 38 is such that groove *f* is in communication with passage 61 and groove *e* is in communication with passage 62. This means that there is pressure P1 under valve 58 and exhaust pressure in the space under piston portion *o*. Hence the spring is holding the two valve sections together and branch 64 of conduit 65 is lapped or cut off by piston portion *m*, and although branch 63 is partially in communication with passage 70, that connection is ineffective since groove *v* is positioned to blank off groove *r*. Hence there is no flow of pressure to the motor 21 and that motor is idle.

As shown in the graph of Fig. 3 the signal suddenly increases after the fourth second and for about two seconds at a rate of 20° per second. The acceleration of the gun is less than that of the signal and it does not follow immediately and then at a rate of only 10° per second. So during that two seconds the error increases and reaches a value at and beyond which the auxiliary motor is energized. When the error assumes a predetermined minimum value, represented by the difference in instantaneous positions of the dotted and full lines in Fig. 3 during that two second period the output of differential 13 is displaced a corresponding amount and valve 38 has been moved down and reaches the position represented by Fig. 6. This displacement of the valve 38 is indicated in Figs. 3 and 4 by the displacement of the dotted line marked valve 38 from the full line marked signal. Since this displacement of the valve is due to the difference between the signal and the pseudo response, that is, the combined response of the main power motor and the auxiliary motor, the displacement of the dotted line of Figs. 3 and 4 from the base of the figure therefore represents the pseudo response. There passage 61 is still on pressure P1 but passage 62 is also now on that pressure, being connected with groove *d*. This raises the upper part of valve 58 against the spring bias and connects branch 64 with passage 68 and places conduit 65 under pressure P3. This starts motor 21 running in a direction to depress piston 72 and groove *v* which thus places grooves *r* and *t* in communication. This connection of grooves *r* and *t* is ineffective as long as the upper part of valve 58 is raised, as the piston portion *o* has closed communication between branch 63 and passage 70. This is the condition shown in Fig. 6. The pressure on top of valve 69 is increased as soon as pressure is admitted to conduit 65 from passage 68 and valve 69 is thus thrown out of balance and moved down, connecting conduit 66 with exhaust passage 41, thus providing a flow circuit for actuation of motor 21 in that direction.

When the signal slows down or reverses and the error stops increasing the motor 21 must stop, and when the error starts to decrease the motor must reverse to remove the accumulative error. Fig. 7 shows the position of the control valve and associated parts when the auxiliary motor is at rest in this stage of transition but with the groove *v* offset ready to connect conduit 65 to exhaust and reverse the motor. This is the condition just as the signal starts to reverse right after the sixth second in the graph. This reversal of the signal received by receiver 8 actuates differential 13 to move pilot valve 39 up. Valve 38 is therefore starting up and the bottom of the recess of valve 58 remains on pressure P1, but the space served by passage 62 is just being connected with exhaust and the pressure is falling so that the spring is beginning to move the upper section of the valve down. Both branches 63 and 64 are lapped so that the conduit 65 does not yet have communication with grooves *r* and *t* and hence with exhaust.

Continued up movement of the valve 38 increases the opening of passage 62 with exhaust and the spring tends to return the upper part of valve 58 to its position where the two sections are together. Branch 63 is thereby placed in communication with passage 70 and since groove *v* is offset downwardly conduit 65 is connected with exhaust. This decreases the pressure on top of valve 69 and that valve rises and connects conduit 66 with pressure P3, thereby generating a pressure P4 in conduit 66, and fluid flows through motor 21 from conduit 66 to conduit 65. Thus motor 21 is driven in reverse direction, but its movement raises piston 72 and groove *v*, as shown in Fig. 8, and so gradually cuts off groove *r* from exhaust groove *t*, the reverse speed of the motor in taking out the supplementary response that it had previously introduced being controlled according to the design of the groove *v*. The speed can thus be made directly proportional to the error, as it will be if the groove has an oblong opening and is oblong in longitudinal cross section, or the speed of return of motor 21 to its central or zero position may be made any other function of the error by modifying the design of the groove.

This reverse operation of motor 21 occurs during the relative movement between the signal and gun represented in the graph of Fig. 3 from the time that the signal reverses directly after the sixth second till synchronism is again restored during the eighth second. As shown on the graph of Fig. 3, when the signal and the auxiliary motor reverse the power motor is running at full speed toward the signal. Since the piston 72 is displaced to its full extent the auxiliary motor would tend to remove the accumulated error at the full speed of the of the auxiliary motor but the speed of the auxiliary motor is automatically controlled by the fact that as it tends to speed up, as it will with passage 62 open wide to exhaust and groove *v* way down, it moves valve 38 down just enough to connect passage 62 to pressure in groove *d* and so again raise the upper section of valve 58 and restrict the flow through branch 63 to exhaust and so check the speed of motor 21. Thus the speed of the composite response which determines the position of valve 58 is automatically regulated so that the response follows the signal during the first part of the reverse movement of motor 21 to subtract the response previously introduced. When the piston 72 has thus been returned toward its central position so that the reduced flow through groove *v* can no longer maintain the speed of the auxiliary motor sufficient to overcome the speed at which the power motor is approaching the signal, the valve 38 is again moved up so that the upper section of valve 58 comes down and then the design of groove *v* comes into play and controls the speed of the auxiliary motor so as to effect the desired synchronizing control. Thus the motor 21 keeps the valve 38 in its constant relation to the signal until due to the slowing down of motor 21 the power motor speed comes to exceed that of the auxiliary motor and the response of shaft 3 exceeds that of shaft 11. Then the response error represented by the position of the output of differential 13 diminishes to zero and reverses in phase, the valve 38 thereby being raised past its central position and main piston 54 and the tilting box are operated to slow down the power motor and bring the gun smoothly into synchronism. If at the instant of synchronism the signal is moving in the opposite direction, the tilting box will be moved far enough to reverse the gun. The design of the control must be such as always to determine the exact point at which the reversal in phase, that is, the deceleration of the gun must begin according to a formula readily derived from the equation for accelerated motion, for example $$v^2=2aD$$

in which $v$ is the relative velocity of the signal and gun, $a$ is the maximum acceleration of the gun and D is the angular distance between the gun and signal.

Figs. 9 to 12 represent the relative positions of the control and amplifier valves during the conditions indicated by the graph of Fig. 4 in which the signal is suddenly decreased at a rate exceeding the ability of the gun to follow.

Fig. 9 represents the conditions during the first four and a fraction seconds when synchronism is maintained. This is in all respects the same as Fig. 5.

Fig. 10 shows the conditions when the gun is lagging behind the rapidly decreasing signal for the two seconds from four and a fraction to six and a fraction seconds. Here valve 38 is moved up instead of down as in Fig. 6, and both passages 61 and 62 are connected to exhaust. The spring pressure prevails and valve 58 is moved down so as to place branch 64 in communication with the exhaust space above piston portion *m*. Conduit 65 is thus connected to exhaust and motor 21 is caused to run in the direction to raise response piston 72 and cause groove *v* to connect grooves *r* and *s*.

Just at the instant when the signal turns and the error is on the decrease which is the condition on the peak of the curve during the sixth second, the valve 38 gets back to the position shown in Fig. 11 in which conduit 65 is blocked off. This is the same condition as in Fig. 7 except that control valve 58 is down instead of up and piston valve 72 is up instead of down and groove *r* is connected to pressure P3 instead of to exhaust.

The continued down movement of valve 38 connects passage 61 to pressure, as shown in Fig. 12, and raises the valve 58 and places conduit 65 through branch passage 63 into communication with groove *r* and hence with pressure P3. This causes the motor 21 to run in the reverse direction and restore the piston 72 and groove *v* to central position, thus gradually cutting off and slowing down motor 21. During this operation of motor 21 the valve 38 is first raised sufficiently to connect passage 61 to exhaust groove *g* just enough to lower valve 58 so that the portion *n* controls the flow from passage 70 to conduit 65 and thus control the speed of motor 21 until it is reduced to the extent when groove *v* should take control to control the final rate of synchronization. While the motor is thus slowing down the response error is erased and then reversed in phase, thus causing valve 38 to control the rate member of the power motor 1 to bring that motor into synchronism with the signal.

Since the function of the auxiliary motor is to supply a corrective response to compensate for the deficiency of the main motor in that respect under certain conditions, and to control this pseudo response so as to cause the main motor to come smoothly into synchronism from a condition of considerable departure, it follows that there is a limit of error beyond which the functioning of the auxiliary motor is futile. It is therefore entirely feasible to have the auxiliary motor cut out when the error exceeds a certain value and then to cut it in again when the error decreases to that value, the only requisite being that the margin be sufficient to assure that the auxiliary motor will coact to start deceleration of the main motor at the proper point for the most extreme conditions of relative signal and gun speeds in view of the maximum possible acceleration of the gun.

To avoid the needless operation of the auxiliary motor beyond that predetermined value of error, stop means such as shown in Fig. 1 may be provided. As shown there stops 80 coact with a traveling nut 81 actuated by screw threads on response shaft 23 to stop rotation of the motor shaft when the nut engages one of the stops.

It is obvious that various modifications may be made in the construction shown in the drawings and above particularly described within the principle and scope of the invention.

I claim:

1. Motion reproducing mechanism comprising a receiver of a transmission system, a driven shaft, a reversible servomotor operatively connected to the driven shaft, a control member having means for adjusting the direction and speed of the servomotor, means for comparing the movements of the receiver and of the driven shaft including an output element, motive means for positioning the control member operatively connected to the output element, an auxiliary motor, means for introducing the movement of the auxiliary motor into the comparing means to modify the position of the output element, and means controlled by the output element for energizing the auxiliary motor.

2. Motion reproducing mechanism comprising a receiver of a transmission system having a rotor, a driven shaft, a reversible servomotor operatively connected to the driven shaft, a control member having means for adjusting the direction and speed of the servomotor, a differential having two input elements and one output element, means for introducing the movements of the receiver rotor and of the driven shaft into the input elements of the differential, motive means for positioning the control member operatively connected to the output element of the differential, a reversible auxiliary motor, means controlled by the output element of the differential for energizing the auxiliary motor, and means for differentially combining the movement of the auxiliary motor with one of the inputs of the differential.

3. Motion reproducing mechanism comprising a receiver of a transmission system, a driven member, a reversible servomotor operatively connected to the driven member, an auxiliary motor, means differentially governed by the receiver, the servomotor and the auxiliary motor having means for controlling the direction and speed of the servomotor, second means differentially governed by the receiver, the servomotor and the auxiliary motor for controlling the displacement of the auxiliary motor from a zero position, said second control means including means normally biasing the auxiliary motor to its zero position and means for controlling the rate of return of the auxiliary motor from a displaced position to its zero position as a function of its displacement from its zero position.

4. A follow-up mechanism comprising a primary motion receiving shaft and a driven shaft, a reversible servomotor connected to drive the driven shaft, a control member having means for adjusting the direction and speed of the servomotor, a differential having two input elements and one output element, means operatively connecting the two shafts to the input elements respectively, motive means for the control member operatively connected to the output element, a hydraulic auxiliary motor, means differentially combining the output of the auxiliary motor with one of the inputs to the differential, a hydraulic system including a pump and passages connecting with opposite sides of the pump, a control valve operative in its respective positions to connect the auxiliary motor reversely to the said passages, and governing means for the control valve responsive to movement of the output element of the differential.

5. A follow-up mechanism comprising a primary motion receiving shaft and a driven shaft, a reversible servomotor connected to drive the driven shaft, a control member having means for adjusting the direction and speed of the servomotor, a differential having two input elements and one output element, means operatively connecting the two shafts to the input elements respectively, motive means for the control member operatively connected to the output element of the differential, a hydraulic auxiliary motor, means differentially combining the output of the auxiliary motor with one of the inputs to the differential, a hydraulic system including a pump and passages connecting with opposite sides of the pump, a slidable piston valve operative in its respective positions to connect the auxiliary motor reversely to the said passages and responsive to hydraulic pressure, and means governed by the output element of the differential for variably adjusting said pressure.

6. A follow-up mechanism comprising a primary motion receiving shaft and a driven shaft, a reversible servomotor connected to drive the driven shaft, a control member having means for adjusting the direction and speed of the servomotor, a differential having two input elements and one output element, means operatively connecting the two shafts to the two input elements respectively, motive means for the control member operatively connected to the output element, a hydraulic auxiliary motor, means differentially combining the output of the auxiliary motor with one of the inputs to the differential, a hydraulic system including a pump and passages connecting with opposite sides of the pump, a cylinder, a piston valve slidable therein and operative in its respective positions to connect the auxiliary motor reversely to the said passages, the valve being biased toward one end of its cylinder, a port in the said end of the cylinder positioned for the admission of hydraulic pressure to oppose the biasing force, valve means for selectively connecting the port with opposite pump passages, and means responsive to the position of the output element of the differential for adjusting the valve means.

7. A follow-up mechanism comprising a primary motion receiving shaft and a driven shaft, a reversible servomotor connected to drive the driven shaft, a control member having means for adjusting the direction and speed of the servomotor, a differential having two input elements and one output element, means operatively connecting the two shafts to the input elements respectively, motive means for the control member operatively connected to the output element, a hydraulic auxiliary motor, means differentially combining the output of the auxiliary motor with one of the inputs to the differential, a hydraulic system including a pump and passages connecting with opposite sides of the pump, a cylinder, a piston valve slidable therein and operative in its respective positions to connect the auxiliary motor reversely to the said passages, the valve being biased toward one end of its cylinder, a port in the said end of the cylinder positioned for the admission of hydraulic pressure to oppose the biasing force, valve means for selectively connecting the port with opposite pump passages, means responsive to the position of the output element of the differential for adjusting the valve means, and a responsive valve operated by the auxiliary motor and connected to cooperate with the piston valve to bias the auxiliary motor to a zero position and to control the speed of the auxiliary motor when returning to its biased position.

8. A follow-up mechanism comprising a primary motion receiving shaft and a driven shaft, a variable speed reversible servomotor connected to drive the driven shaft, a control member having means for adjusting the direction and speed of the servomotor, a differential having two input elements and one output element, means operatively connecting the two shafts to the input elements respectively, a hydraulic system including a pump and passages connecting with opposite sides of the pump, a main piston operatively connected to the control member, an amplifier piston valve arranged to control the opposing pressures on the main piston, a pilot valve operatively connected to the output element of the differential and arranged to control the opposing pressures on the amplifier valve, a hydraulic auxiliary motor, means differentially combining the output of the auxiliary motor with one of the inputs of the differential, a cylinder, a piston valve slidable therein and operative in its respective positions to connect the auxiliary motor reversely to the said passages and responsive to hydraulic pressure in the cylinder, said cylinder having a port through which its effective hydraulic pressure is regulated, and grooves in the amplifier valve communicating with the passages and arranged to be selectively connected with the cylinder port to control the position of the piston valve.

9. A follow-up mechanism comprising a primary motion receiving shaft and a driven shaft, a variable speed reversible servomotor connected to drive the driven shaft, a control member having means for adjusting the direction and speed of the servomotor, a differential having two input elements and one output element, means operatively connecting the two shafts to the input elements respectively, a hydraulic system including a pump and passages connecting with opposite sides of the pump, a main piston operatively connected to the control member, an amplifier piston valve arranged to control the opposing pressures on the main piston, a pilot valve operatively connected to the output element of the differential and arranged in control of the opposing pressures on the amplifier valve, a hydraulic auxiliary motor, means differentially combining the output of the auxiliary motor with one of the inputs of the differential, a cylinder, a piston valve slidable therein and operative in its respective positions to connect the auxiliary motor reversely to the said passages, the piston valve being biased axially in one direction and the cylinder having at the end toward which the valve is biased a port for the admission of hydraulic pressure to oppose the biasing force, and grooves in the amplifier valve communicating with the passages and arranged to be selectively connected with the port to control the position of the piston valve.

10. A follow-up mechanism comprising a primary motion receiving shaft and a driven shaft, a variable speed reversible servomotor connected to drive the driven shaft, a control member having means for adjusting the direction and speed of the servomotor, a differential having two input elements and one output element, means operatively connecting the two shafts to the input elements respectively, a hydraulic system including a pump and passages connecting with opposite sides of the pump, a main piston operatively connected to the control member, an amplifier piston valve arranged to control the opposing pressures on the main piston, a pilot valve operatively connected to the output of the differential and arranged in control of the opposing pressures on the amplifier valve, a hydraulic auxiliary motor, means differentially combining the output of the auxiliary motor with one of the inputs of the differential, a cylinder, a piston valve slidable therein and operative in its respective positions to connect the auxiliary motor reversely to the said passages, the valve being biased axially in one direction, the cylinder having at the end toward which the valve is biased a port for the admission of hydraulic pressure to oppose the biasing force, grooves in the amplifier valve communicating with the passages and arranged to be selectively connected with the port to control the position of the piston valve, and a response valve operated by the auxiliary motor and cooperating with the piston valve to bias the auxiliary motor to a zero position and to control the speed of the auxiliary motor when returning to its zero position.

11. Motion reproducing mechanism comprising a receiver of a synchronous transmission system, a driven shaft, a variable speed reversible servomotor connected to drive the driven shaft, a control member having means for adjusting the direction and speed of the servomotor, a hydraulic system including a pump and passages connecting with opposite sides of the pump, a main piston having opposing pressure acting upon its ends, means operatively connecting the main piston to the control member, an amplifier piston valve having opposing pressures acting upon its ends, means actuated by the amplifier piston valve to control the opposing pressures on the main piston, a pilot valve connected to control the opposing pressures on the amplifier valve, differential combining means having imputs connected for differentially combining the movement of the driven shaft with the effective movement of the receiver, means for actuating the pilot valve by the output of said combining means, a hydraulic auxiliary motor, means for differentially combining the output of the auxiliary motor with one of the inputs to the first mentioned combining means, a cylinder, a piston valve slidable therein and operative in its respective positions to connect the auxiliary motor reversely to the said passages, the valve being biased axially in one direction, a cylinder having at the end toward which the valve is biased a port for the admission of hydraulic pressure to oppose the biasing force, grooves in the amplifier valve communicating with the passages and arranged to be selectively connected with the port to control the position of the piston valve, and a response valve operated by the auxiliary motor and cooperating with the piston valve to bias the auxiliary motor to a zero position and to control the speed of the auxiliary motor when returning to its zero position.

12. Motion reproducing mechanism comprising coarse and fine receivers of a synchronous transmission system, a driven shaft, a variable speed reversible servomotor connected to drive the driven shaft, a control member having means for adjusting the direction and speed of the servomotor, a hydraulic system including a pump and high and low pressure passages connecting with opposite sides of the pump, a main piston actuated by opposing pressures and connected to position the control member, an amplifier piston valve actuated by opposing pressures and arranged to control the opposing pressures on the main piston, a fine pilot valve operatively connected to the fine receiver and arranged to control the opposing pressures on the amplifier valve, a recess at each end of the pilot valve, restricted passages connecting the high and low pressure passages with said recesses, and a coarse pilot valve operatively connected to be positioned by the coarse receiver and arranged in its respective positions to vary the restriction in the restricted passages, thereby placing a bias upon the fine pilot valve.

13. Motion reproducing mechanism comprising coarse and fine receivers of a synchronous transmission system, a driven shaft, a variable speed reversible servomotor connected to drive the driven shaft, a control member having means for adjusting the direction and speed of the servomotor, a hydraulic system including a pump and high and low pressure passages connecting with opposite sides of the pump, a main piston actuated by opposing pressures and connected to position the control member, an amplifier piston valve actuated by opposing pressures and arranged to control the opposing pressures on the main piston, a fine pilot valve operatively connected to the fine receiver and arranged to control the opposing pressures on the amplifier valve, a recess at each end of the pilot valve, restricted passages connecting the high pressure passage with each recess, and a coarse pilot valve operatively connected to the coarse receiver and arranged to connect the low pressure passage to the two recesses through inversely restricted ports.

14. Motion reproducing mechanism comprising coarse and fine receivers of a synchronous transmission system, a driven shaft, a variable speed reversible servomotor connected to drive the driven shaft, a control member having means for adjusting the direction and speed of the servomotor, a hydraulic system including a pump and high and low pressure passages connecting with opposite sides of the pump, a main piston actuated by opposing pressures and operatively connected to position the control member, an amplifier piston valve actuated by opposing pressures and arranged to control the opposing pressures on the main piston, a fine pilot valve connected to control the opposing pressures on the amplifier valve, a recess at each end of the pilot valve, restricted passages connecting the high and low pressure passages with said recesses, a coarse pilot valve operatively connected to be positioned by the coarse receiver and arranged in its respective positions to vary the restriction in the restricted passages, thereby placing a bias upon the fine pilot valve, means for differentially combining the movement of the driven shaft with the effective movement of the fine receiver, a hydraulic auxiliary motor, means differentially combining the movement of the auxiliary motor with the effective movement of the fine receiver, a slidable piston valve operative in its respective positions to connect the auxiliary motor reversely with the high and low pressure passages and adapted for adjustment by hydraulic pressure and having a port through which its effective hydraulic pressure is regulated, grooves in the amplifier valve communicating with the high and low pressure passages and arranged to be selectively connected with the port of the piston valve controlling the auxiliary motor, and a response valve operated by the auxiliary motor and cooperating with the auxiliary motor piston valve to bias the auxiliary motor to a zero position and to control the speed of the auxiliary motor when returning to its zero position.

References Cited in the file of this patent

UNITED STATES PATENTS

| | | |
|---|---|---|
| 1,481,645 | Kaminski | Jan. 22, 1924 |
| 1,684,132 | Hewlett et al. | Sept. 11, 1928 |
| 2,068,490 | Hull | Jan. 19, 1937 |
| 2,160,779 | Granat | May 30, 1939 |